US010772308B2

(12) United States Patent
Bronstein Garin

(10) Patent No.: US 10,772,308 B2
(45) Date of Patent: Sep. 15, 2020

(54) SYSTEM FOR THE TREATMENT AND RECIRCULATION OF FRESHWATER OR SALTWATER TO RESTORE WATER QUALITY TO OPTIMUM LEVELS IN FISH FARMING CAGES

(71) Applicant: Rodrigo Lazarraga Muñoz, Las Condes, Santiago (CL)

(72) Inventor: Guillermo Octavio Bronstein Garin, Reñaca-Viña del Mar (CL)

(73) Assignee: RODRIGO LAZARRAGA MUÑOZ, Las Condes, Santiago (CL)

( * ) Notice: Subject to any disclaimer, the term of this patent is extended or adjusted under 35 U.S.C. 154(b) by 0 days.

(21) Appl. No.: 16/494,364

(22) PCT Filed: Jul. 4, 2018

(86) PCT No.: PCT/CL2018/000024
§ 371 (c)(1),
(2) Date: Sep. 16, 2019

(87) PCT Pub. No.: WO2019/006567
PCT Pub. Date: Jan. 10, 2019

(65) Prior Publication Data
US 2020/0120907 A1    Apr. 23, 2020

(30) Foreign Application Priority Data
Jul. 4, 2017   (CL) .................................. 1776-2017

(51) Int. Cl.
*A01K 63/04*    (2006.01)
*B01D 61/14*    (2006.01)
(Continued)

(52) U.S. Cl.
CPC .......... *A01K 63/045* (2013.01); *A01K 63/042* (2013.01); *B01D 61/145* (2013.01);
(Continued)

(58) Field of Classification Search
CPC .. A01K 63/045; A01K 63/042; A01K 63/047; B01D 61/145; B01D 71/68;
(Continued)

(56) References Cited

U.S. PATENT DOCUMENTS

| 2007/0245971 A1* | 10/2007 | Rayner ................. A01K 63/02 119/201 |
| 2009/0281480 A1* | 11/2009 | Orlebeke ............. A01K 63/042 604/24 |
| 2013/0001162 A1* | 1/2013 | Yangali-Quintanilla .................... B01D 61/002 210/636 |

FOREIGN PATENT DOCUMENTS

| CN | 101891342 | 11/2010 |
| CN | 102499166 | 6/2012 |
| WO | 97/49279 | 12/1997 |

* cited by examiner

*Primary Examiner* — Fred Prince
(74) *Attorney, Agent, or Firm* — Clark & Brody LP

(57) ABSTRACT

A water treatment and recirculation system includes means to transport water flows at required pressures, a mechanical filter of approximately 100 microns to capture coarse particles, oxygen production means, autonomous electricity generation means, and variable control means using a PLC that administers parameters such as pressure, oxygen and $CO_2$ levels, flows, pH, etc. The system also includes means to ultrafilter and remove particles of up to 0.02 microns, the purpose being removing organic material macromolecules, disinfecting bacteria and viruses with mechanical removal, and eliminate harmful contaminants such as ammonia, degasifying means to eliminate $CO_2$ with a multitubular exchanger with membranes made of hydrophobic materials and micro perforations to take $CO_2$ away to an extraction gas in atmospheric or vacuum conditions; and means to oxygenate water with a multitubular exchanger having membranes constituted by hydrophobic materials and microper- (Continued)

forations that inject $O_2$ into water of a gas under atmospheric conditions.

1 Claim, 2 Drawing Sheets

(51) Int. Cl.
      B01D 71/68      (2006.01)
      C02F 9/00      (2006.01)
      C02F 1/00      (2006.01)
      C02F 1/20      (2006.01)
      C02F 1/44      (2006.01)
      C02F 1/72      (2006.01)
      *C02F 101/16*      (2006.01)
      *C02F 101/20*      (2006.01)
      *C02F 101/30*      (2006.01)
      *C02F 103/08*      (2006.01)
      *C02F 103/20*      (2006.01)

(52) U.S. Cl.
      CPC ............... B01D 71/68 (2013.01); C02F 9/00 (2013.01); *A01K 63/047* (2013.01); *C02F 1/004* (2013.01); *C02F 1/20* (2013.01); *C02F 1/444* (2013.01); *C02F 1/727* (2013.01); *C02F 2101/16* (2013.01); *C02F 2101/20* (2013.01); *C02F 2101/30* (2013.01); *C02F 2103/08* (2013.01); *C02F 2103/20* (2013.01); *C02F 2201/009* (2013.01); *C02F 2209/005* (2013.01); *C02F 2209/03* (2013.01); *C02F 2209/22* (2013.01); *C02F 2209/24* (2013.01); *C02F 2303/04* (2013.01)

(58) Field of Classification Search
      CPC .... C02F 9/00; C02F 2209/03; C02F 2101/16; C02F 2101/20; C02F 2101/30; C02F 1/444; C02F 1/004; C02F 2201/009; C02F 2209/005; C02F 2103/20; C02F 2303/04; C02F 2209/22; C02F 1/20; C02F 2209/24; C02F 2103/08; C02F 1/727
      USPC ......... 210/167.19, 167.22, 615, 903, 167.21, 210/167.26; 119/226, 260, 227, 259
      See application file for complete search history.

FIG. 1 (PREVIOUS ART)

SYSTEM FOR THE TREATMENT AND RECIRCULATION OF FRESHWATER OR SALTWATER TO RESTORE WATER QUALITY TO OPTIMUM LEVELS IN FISH FARMING CAGES

FIELD OF APPLICATION

This invention refers to a system for the treatment and recirculation of freshwater or saltwater; more specifically, it refers to a Recirculating Aquaculture System (RAS) (Sistema de Recirculación Acuicola (RAS)).

PRIOR ART DESCRIPTION

Farmed fish in any facility must be raised with the proper and necessary conditions to keep them in good health and to grow with a good Feed Conversion Rate (FCR) (Tasa de Conversión Alimenticia (FCR)). Fish need a continuous supply of clean water at a suitable temperature and optimal dissolved oxygen content for good growth.

Fish farms having water recirculation perform these tasks. A mechanical and biological system is needed to purify the water and eliminate or detoxify waste products and unused foodstuffs. Fish must be fed every day with nutritionally complete food in order to stimulate their fast growth and high survival.

There are several designs for recirculation systems and most of them operate effectively if they have oxygen and aeration, retention of particles, biological filtering to eliminate the ammonia and nitrite residues, and damping of water pH levels. These processes may be achieved with the use of simple units, which use a combination of filters and are often used in small farms. Filtration at large farms uses several interconnected components and unit processes.

The Recirculating Aquaculture Systems (RAS) represent an exciting, ecological, and exclusive way to breed fish. Unlike the traditional fish breeding method in open air tanks, net cages or tanks, they allow the breeding of fish at high densities, within a breeding environment that may be controlled by the facility operator. Filters in the recirculation systems clean up and recycle the water, returning it to the fish breeding tanks. New water is added to the tanks only to compensate water losses resulting from spatter, evaporation, and to replace the water used to eliminate waste materials.

RAS designs have several process technologies, which work jointly in order to guarantee a minimum loss of water, heat, and fish populations; at the same time that they constantly clean up and recycle the water in fish tanks.

Breeding farms with RAS may be designed with different complexity levels; however, true water recirculation designs imply the use of equipment to safely remove and store residues, guarantee cleanliness, reutilize water, and keep breeding conditions close to the optimum environment for the fish species being bred.

On the contrary, many of the breeding systems in tanks formerly employed in fish farming are denominated "open" or "fluid" systems because water goes through the tank only once and subsequently discarded. Even though some improvements have been applied to the former designs, with the purpose of reducing the use of water and create hybrid operation schemes, they are not exactly recirculation farms.

Since RAS farms recycle most of their water, they use much less water than other breeding systems, so that they are especially suited for areas having limited water reserves.

A properly designed and operated recirculation system requires a minimum daily intake, sufficient for cleaning up the residues in the filters and replacing evaporated water. This allows the construction of fish farms in areas where underground water is limited and even opens up the possibility of setting up operations in an urban area using municipal water without chlorine.

Since fish in a recirculation system are bred in tanks with oxygen supply and their metabolic wastes are eliminated with the constant recirculation of water, fish may be bred at high densities and safely.

The low water requirement of recirculation systems translates into low water availability, so that water temperature control (and growth rates of fish populations) is one of the greatest benefit of these systems. Water temperature control allows fish farmers to produce a particular species of fish, which could not normally be bred in a particular geographical area. It also allows fish farmers to keep water temperature at the optimum level in order to maximize food conversion resulting in optimum growth. Growth may also take place during the entire year, maximizing production and allowing fast product rotation. In theory, product marketing is also improved because fish reach their selling size every week.

With the breeding of fish in closed facilities, fish farmers are no longer limited by weather conditions, where a sudden cold wave may do away with the production of a whole year killing fish larvae or disrupting the normal spawning of the breeders. In addition, tank and cage fish farmers may lose their harvests because of low summer or winter oxygen levels and experience more difficulties in predator control. Keeping fish in closed facilities also allows harvesting with heavy rain, snow, or frost that could otherwise stop harvesting cages or tanks.

Fish farms with RAS in enclosed facilities are designed to prevent fish escapes, resulting in lower chances of loss and mitigation of the possible conflicts with regulations on water bodies and fish escapes.

With recirculation systems, fish farmers can control water quality in order to benefit the living fish population and the final product sale to supermarkets. While keeping dissolved oxygen at optimum levels fish have a better food conversion rate and are less stressed, which translates into a greater resistance to diseases, less food waste, and increased growth.

In addition, fish are isolated from possible environmental contaminants, such as the bad flavor caused by the proliferation of algae that may affect cages, and from any potential contamination from pesticide residues in water. This results in a high quality product. In many cases where fresh water is provided by wells, the probability of disease outbursts is greatly reduced and no medicines are needed. The main objectives of these water recirculation systems are:

To provide an optimum and sustainable physical environment for fish in terms of space, water volume, and breeding/population density.

To protect fish population from infections caused by pathogenic agents.

To provide, keep, and guarantee the physiological needs of fish (mostly oxygen and nutrition). To eliminate fish metabolic wastes (feces, CO2, and ammonia). To eliminate food waste and degradation products (solid and dissolved organic compounds).

To keep water temperature and chemical parameters within acceptable quality limits.

However, these systems often have large or enormous dimensions because they must include a series of subsystems such as: Tanks, Oxygen; Foam Fractionator; Mechanical Filter (MF); Biological Filter (BF); Heaters/Coolers; Sterilizers; Lighting; Control Systems (optional).

In a traditional water treatment and recirculation system, water is gravitationally transported from tanks to the treatment system, where this water goes through rotating filters that remove solid particles larger than 40 [μm]. Next, water is accumulated in a first Reservoir. Return pumps take the water and take it to submerged bio filters that remove fish metabolic wastes by means of the consumption of oxygen. The water subsequently flows gravitationally into a degassing filter. This filter mainly "separates" carbon dioxide from the water and aerates it. Next, the water enters passively into a second Reservoir. "New" water is added at this second Reservoir, depending on the required renewal and salinity levels. In addition, at this point system water temperature is controlled and regulated and system water pH, temperature, and salinity are monitored. The amount of fresh water coming into the system depends on the daily feed amount that is delivered. It generally ranges between 0.5-0.8 m3 of fresh water for every kilogram if daily feed and it is also used to bring down nitrate concentration. Subsequently, low pressure pumps transport water from the second Reservoir towards a UV filter. This filter reduces pathogens in the water that is now sent to the fish. This line contributes 60% of tank water.

High pressure pumps transport water towards oxygenation cones, where water is oversaturated with oxygen in order to cover the demand of fish. This line contributes 40% of tank water.

Finally, both water lines come together when they return to the fish tanks.

All the preceding is also available when this RAS system is implemented at sea, that is, it operates with saltwater.

SUMMARY OF THE INVENTION

A water treatment and recirculation system to restore water quality to optimum levels, in a fish farming system mainly aimed at freshwater and saltwater fish farming industry and/or stocking centers, comprising means to transport water flows at the required pressures, a coarse mechanical filter of approximately 100 microns, whose focus is to capture coarse particles, oxygen production means, autonomous electricity generation means; and variable control means using a PLC that administers variables such as pressure, oxygen and $CO_2$ levels, flows, pH, among others, which comprises:
a) Means to ultrafilter and remove particles of up to 0.02 microns, with the purpose of removing organic material macromolecules, disinfecting bacteria and viruses with mechanical removal, and eliminate harmful contaminants such as ammonia;
b) Degasifying means to eliminate $CO_2$ with a multitubular exchanger with membranes made of hydrophobic materials and micro perforations taking the $CO_2$ to an extraction gas in atmospheric or vacuum conditions; and
c) Means to oxygenate water with a multitubular exchanger made up of membranes constituted by hydrophobic materials and micro perforations that inject into water the $O_2$ of a gas under atmospheric conditions.

DETAILED DESCRIPTION OF THE INVENTION

Figure 1:
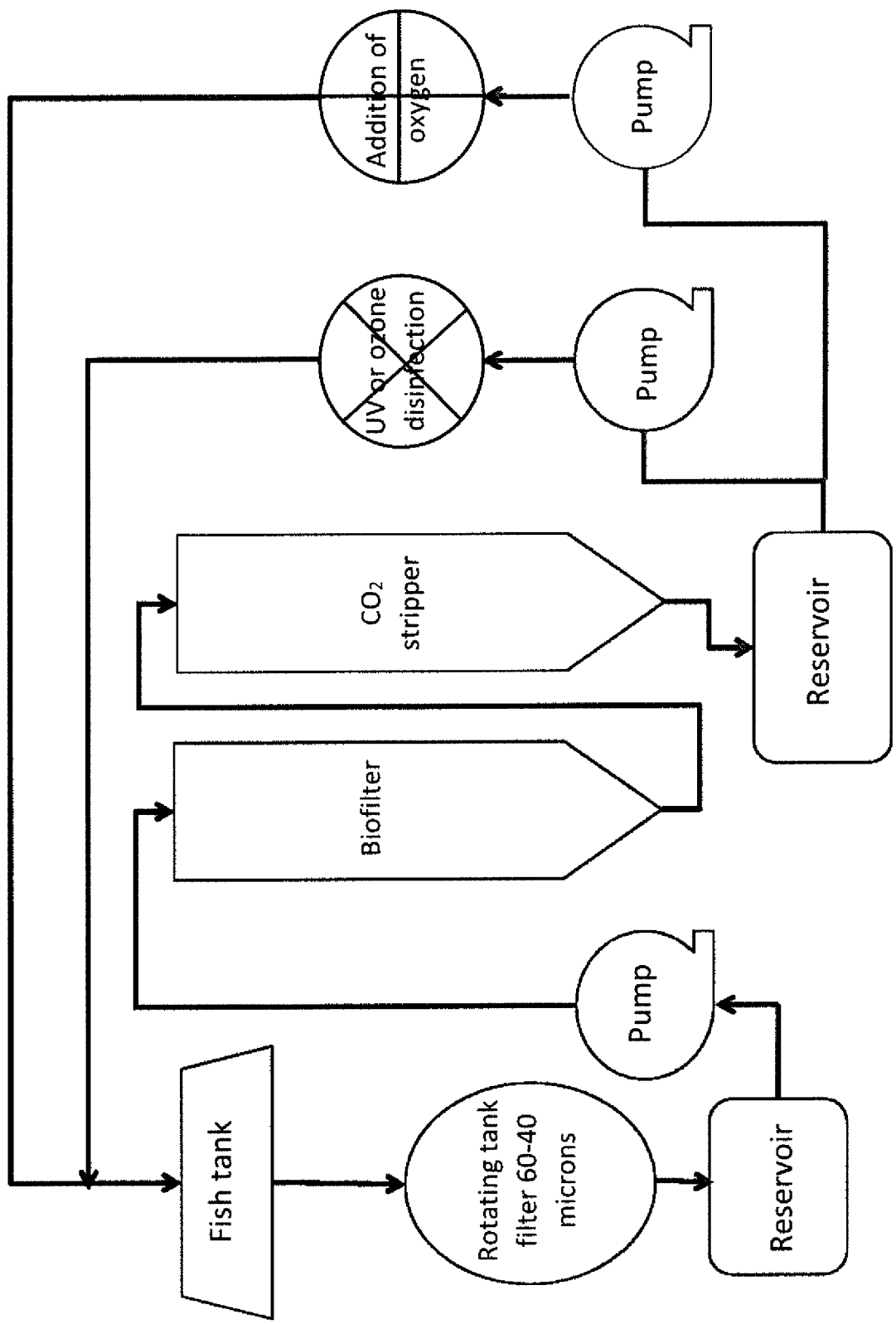
FIG. 1 (Prior Art) shows a general schematic of a prior art water recirculation and treatment system.
Figure 2:
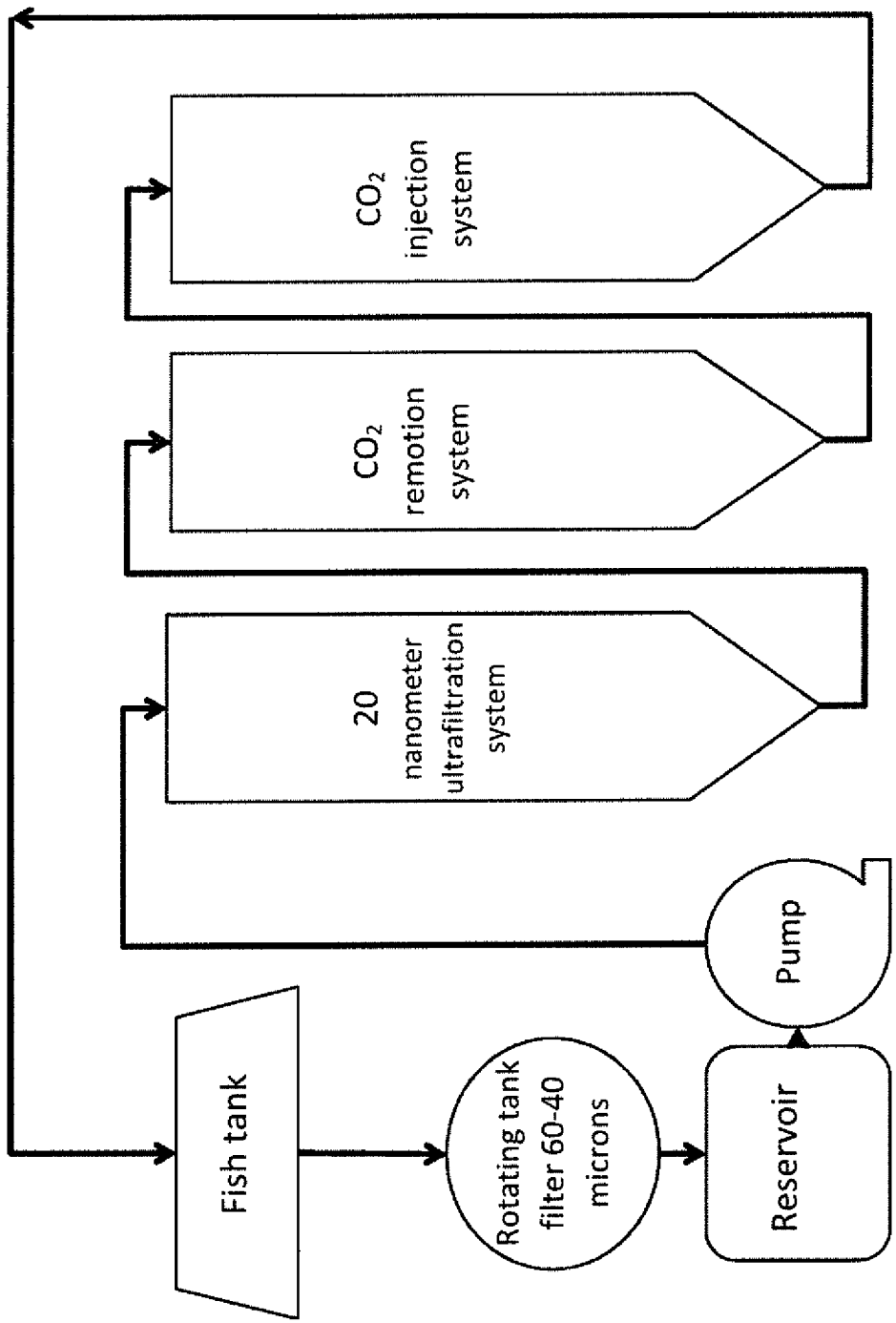
FIG. 2 shows a general schematic of the water recirculation and treatment system in this invention.

As shown in FIG. 2, water treatment and renewal means are essential because we are in the presence of a closed system so that this renewal water must be in special conditions in order to maximize the survival of fish in freshwater or saltwater cages.

First, it is necessary to raise water pressure with a pump in order to generate pressure and in this way drive water flows at the required pressures.

Second, water goes into a prefiltering system to remove coarse particles, which comprises a coarse mechanical filtration with a wire mesh of approximately 100 microns.

Next, and as an element of this invention, there is an ultra filtration process by means of a PES (Polyethersulfone) membranes system that disinfects water with the physical removal of bacteria and viruses, eliminates organic material and ammonia, and improves water quality.

The ultrafiltration system, having very small 20 nanometers pores, performs several functions disinfecting water because pathogens have larger sizes. In fact, the size of bacteria is around 1 micron, the size of spores is 1 micron, and the size of viruses is around 100 nanometers. The ultrafiltration system also removes all solids suspended in water, considerably improving its quality and also removes nitrogen and carbon organic molecules that normally degrade to $NH_4$ and $CO_2$; this brings down the quantity of generated ammonia and, consequently, the need for bio filtration. Finally, heavy metals are removed from the water.

This system allows the removal of all the above through mechanical filtration and consequently avoids the dependence on living organisms, such as a bio filter in an online system, that does not lose line pressure and having a modular design that allows growth and easy maintenance.

In addition, it is also necessary to degasify and eliminate the $CO_2$ by means of a multitubular exchanger with membranes made of hydrophobic material and micro perforations that take away the $CO_2$ to an extraction gas in atmospheric or vacuum conditions.

This gas exchange system has great advantages in respect of traditional degassing equipment and oxygen cones because its hydrophobic fibers with nanometric pores provide conditions for a very high transfer of gas between the liquid outside the fiber and the gas, thereby easily reaching the point of equilibrium with equipment having a very high transfer ratio versus size. For example, the capacity of equipment with a diameter of 40 [cm] and a length of 1.2 [m] is 80 m³/h.

The flow of gas will be from the liquid to the gas or from the gas to the liquid depending of the Henry Law equation. For example, if there is liquid water with an $O_2$ saturation of 6 [ppm] and a flow rich in $O_2$ as exchange gas, injecting oxygen to the water at 1 [atm] it is possible to reach a saturation of 50 [ppm] and, if pressure is increased to 2 [atm], a saturation of 100 [ppm] can be reached. On the other hand, using $O_2$ downgraded gas as a 100% $N_2$ flow, water will turn over its $O_2$ to the gas flow and may reach concentrations as low as 20 parts per billion [ppb].

This is how this system firstly uses air in vacuum conditions as degassing equipment to remove $CO_2$ from water and subsequently uses $O_2$ to inject oxygen into water, using cones or systems made of hydrophilic membranes or a multitubular system with micro perforations and pressures above atmospheric pressure.

The injected oxygen may be produced in situ with a VPSA technology oxygenation system. The VPSA technology generates in situ oxygen with fuel consumption significantly lower than alternative technologies. It is also possible to use purchased oxygen stored in Liquid Oxygen Cylinders (LOX).

Finally, all this water treatment and recirculation process may be controlled with a PLC in order to administer variables such as pressure, oxygen and $CO_2$ levels, and flows, among others.

The invention claimed is:

1. A water treatment and recirculation system to restore water quality to optimum levels, in a fish farming system mainly aimed at the freshwater and saltwater fish farming industry and/or stocking centers, comprising:
   means for transporting water flows at required pressures,
   a coarse mechanical filter of approximately 100 microns, whose focus is to capture coarse particles,
   oxygen production means,
   autonomous electricity generation means; and
   variable control means using a PLC that administers parameters comprising pressure, oxygen and CO2 levels, flows, and pH, and further comprising:
   a) means to ultrafilter and remove particles of up to 0.02 microns, with a purpose of removing organic material macromolecules, disinfecting bacteria and viruses with mechanical removal, and eliminating harmful contaminants including ammonia;
   b) degasifying means to eliminate CO2 with a multitubular exchanger with membranes made of hydrophobic materials and micro perforations taking the CO2 to an extraction gas in atmospheric or vacuum conditions; and
   c) means to oxygenate water with a multitubular exchanger made up of membranes constituted by hydrophobic materials and micro perforations that inject O2 of a gas under atmospheric conditions into water.

* * * * *